H. D. STARR.
FRUIT PICKER.
APPLICATION FILED AUG. 30, 1911.
1,025,214.
Patented May 7, 1912.
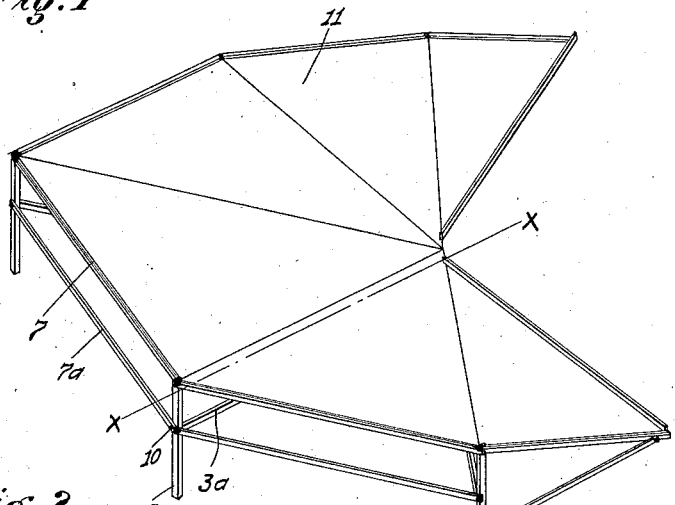
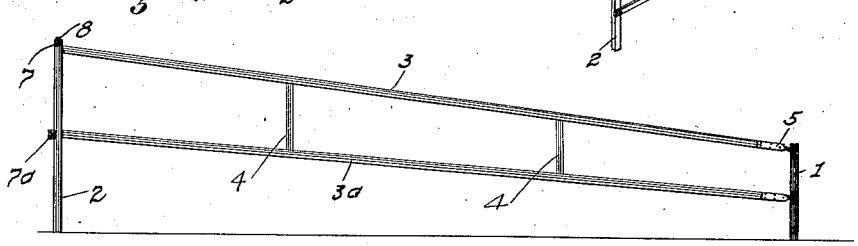
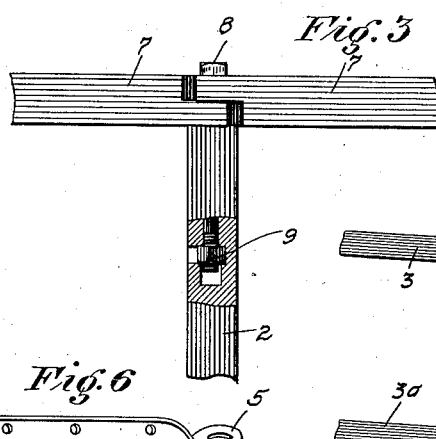
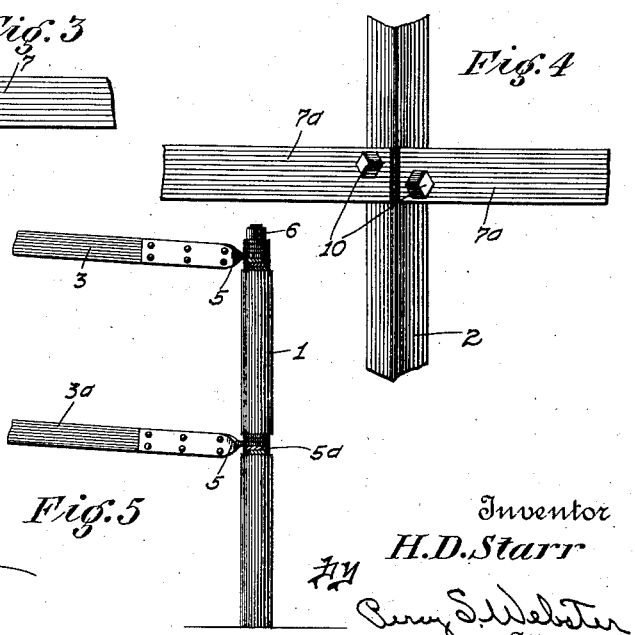
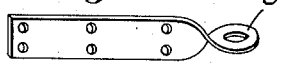
Witnesses
Inventor
H. D. Starr
Attorney

UNITED STATES PATENT OFFICE.

HARRY D. STARR, OF LODI, CALIFORNIA.

FRUIT-PICKER.

1,025,214.   Specification of Letters Patent.   Patented May 7, 1912.

Application filed August 30, 1911. Serial No. 646,897.

*To all whom it may concern:*

Be it known that I, HARRY D. STARR, a citizen of the United States, residing at Lodi, in the county of San Joaquin, State of California, have invented certain new and useful Improvements in Fruit-Pickers; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to a new and improved means for facilitating the picking of fruit, the object of the invention being to produce a canvas catcher or chute on which the fruit will be knocked from the trees and rolled thus into the boxes, the same being so devised that the fruit can be picked from one half of a tree at a time.

A further object of the invention is to produce a device which is capable of being folded up in a compact and neat manner when not in use.

A further object of the invention is to produce a simple and inexpensive device, and yet one which will be exceedingly effective for the purposes for which it is designed.

These objects I accomplish by means of such structure and relative arrangement of parts as will fully appear by a perusal of the following specification and claim.

In the drawings similar characters of reference indicate corresponding parts in the several views.

Figure 1 is a perspective view of the complete device. Fig. 2 is a sectional view taken on a line X—X of Fig. 1. Fig. 3 is a fragmentary view showing a hinged joint. Fig. 4 is a fragmentary view showing a brace joint connection. Fig. 5 is a fragmentary view showing the center supporting post of the device and hinged brace rods thereon. Fig. 6 is a fragmentary view showing a supporting ring.

Referring now more particularly to the characters of reference on the drawings, I first provide a center supporting post 1 and outer supporting posts 2 disposed in a circumferential manner around said center post as shown in Fig. 1. From the said center post 1 to the outer posts 2 I provide supporting rods 3, and substantially parallel supporting rods $3^a$ provided with cross brace rods 4. The rods 3 and $3^a$ are fixed stationary with respect to the posts 2 on which they are secured. The other ends of said members 3 and $3^a$ are provided with rings or eyes 5 and $5^a$ respectively, through which a bolt 6 is passed binding them to the center post which is made in two parts for the purpose as shown in Fig. 5, the said nut 6 also binding these two parts together when the supporting rods are in position as shown. Between the posts 2 are brace rods 7 and $7^a$, the brace rods 7 mortising into each other at their ends and being bound to the tops of the posts 2 by means of bolts 8, there being nuts 9 set into said posts to receive said bolts 8, the rods 7 are bolted to the posts 2 in an oblique manner by bolts 10, as shown in Fig. 4.

Stretched over the members 3 is a canvas 11, the same being secured to the brace rods 7 in any suitable fashion, but preferably by means of straps and buckles so that the canvas may be stretched as tightly over the members 3 as may be desired. In practice the post 1 is lower than the posts 2 which gives the entire device a concave shape, and hence the fruit that drops on to the canvas 10 will be deflected toward the post 1 where it is deposited into the boxes. The device is made of such width and length that it can be set under one-half of the tree at a time whereby all the fruit from said one-half of the tree can be deposited on the device without the necessity of moving it.

When it is desired to transfer the device from one place to another or to store the same, the bolts 8 and 10 may be removed which permits the rods 7 and $7^a$ to be taken off and then the bolts 6 may be loosened and the posts 2 and rods 3 and $3^a$ can be turned by means of the eyes 5 to a substantially parallel folded position which makes a compact, neat bundle ready for transportation or storage.

From the foregoing description it will readily appear that I have produced such a device as substantially fulfils the object of the invention as set forth herein.

While this specification sets forth in detail the present and preferred construction of the device, still in practice such deviations from such detail may be resorted to as do not form a departure from the spirit of the invention.

Having thus described my invention what

I claim as new and useful and desire to secure by Letters Patent is:—

A device of the character described comprising a center post, outer posts disposed in a circumferential manner around said center post, such center post being of a lesser height than said outer posts, supporting rods fixed stationary on said outer posts and having eyes on their inner ends, bolts projecting through said eyes and into said center post, brace rods projecting between said outer posts and mortising into each other, bolts projecting through said brace rods and into said outer posts, and a canvas stretched over said supporting rods, as described.

In testimony whereof I hereunto affix my signature in presence of two witnesses.

HARRY D. STARR.

Witnesses:
STEPHEN N. BLEWETT,
FRANK H. CARTER.

Copies of this patent may be obtained for five cents each, by addressing the "Commissioner of Patents, Washington, D. C."